May 24, 1949.  J. V. SCHUG  2,471,377
COTTON CHOPPER AND CULTIVATOR
Filed Feb. 13, 1946  3 Sheets-Sheet 1

Inventor
JOHN V. SCHUG

By Clarence A. O'Brien
and Harvey B. Jackson
Attorneys

May 24, 1949. J. V. SCHUG 2,471,377
COTTON CHOPPER AND CULTIVATOR
Filed Feb. 13, 1946 3 Sheets-Sheet 2

Inventor
JOHN V. SCHUG.

By Clarence A. O'Brien
and Harvey B. Jacobson
Attorneys

May 24, 1949. J. V. SCHUG 2,471,377
COTTON CHOPPER AND CULTIVATOR
Filed Feb. 13, 1946 3 Sheets-Sheet 3

Inventor
JOHN V. SCHUG.

By *Clarence A. O'Brien and Harvey B. Jacobson*
Attorneys

Patented May 24, 1949

2,471,377

UNITED STATES PATENT OFFICE 2,471,377

COTTON CHOPPER AND CULTIVATOR

John V. Schug, Paragould, Ark.

Application February 13, 1946, Serial No. 647,292

4 Claims. (Cl. 97—12)

This invention relates to improvements in agricultural implements, and more particularly to a cotton chopper and cultivator.

An object of the invention is to provide an improved cotton chopper and cultivator adapted to be secured to a tractor or tractor drawn cultivator which will be operated by a ground engaging wheel suitably geared to drive the chopper wheel and soil loosener and grass picker wheels as the device is drawn along the rows of cotton.

Another object of the invention is to provide an improved cotton chopper and cultivator attachment which may be secured to a tractor or a tractor drawn cultivator, whereby cotton may be blocked out, cleaned of grass, the soil of the row loosened, and the cotton dirted up in one operation.

A further object of the invention is to provide an improved cotton chopper and cultivator which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
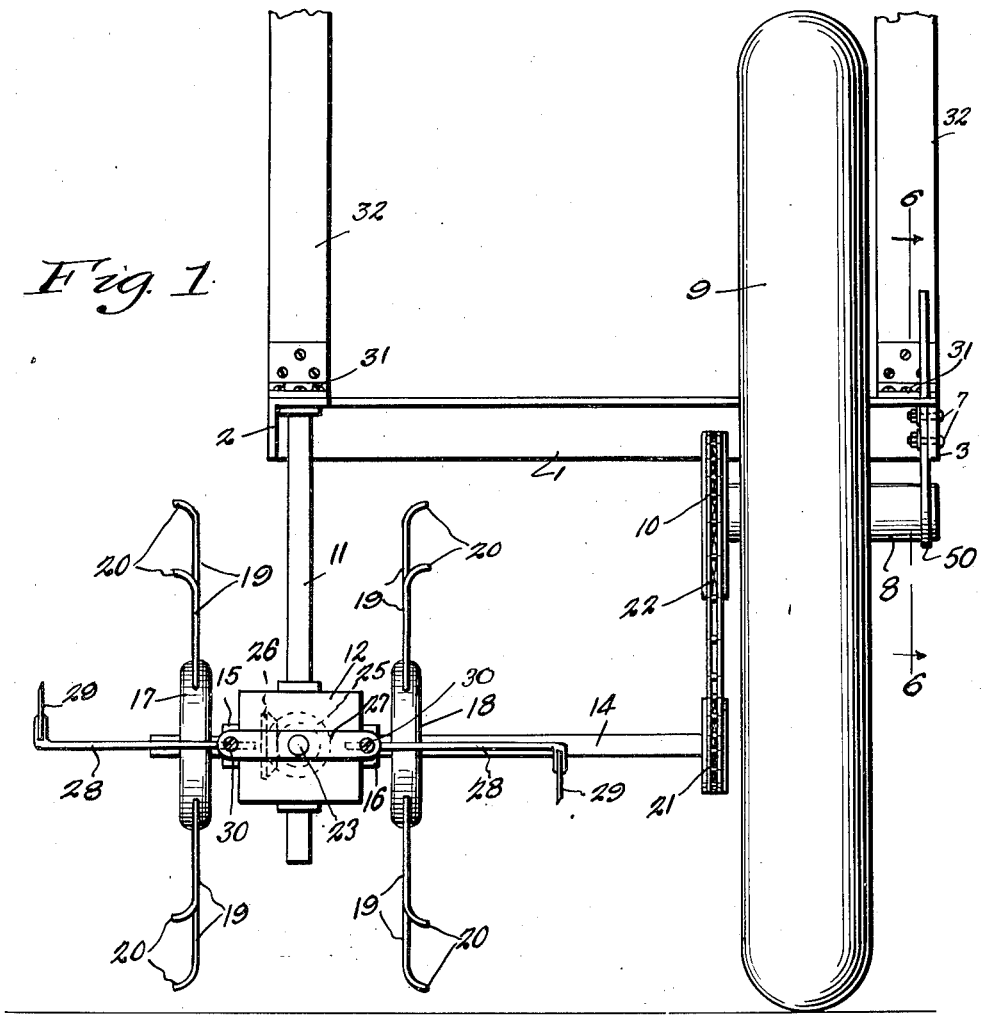
Figure 1 is a front elevation of the improved cotton chopper and cultivator.
Figure 2:
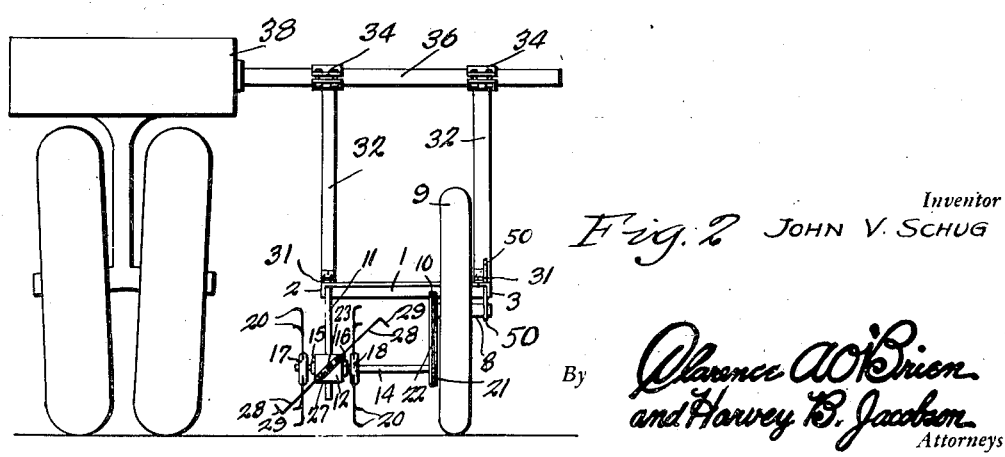
Figure 2 is a front elevation of the improved cotton chopper and cultivator showing the same attached to a cultivator frame of a tractor.
Figure 3:
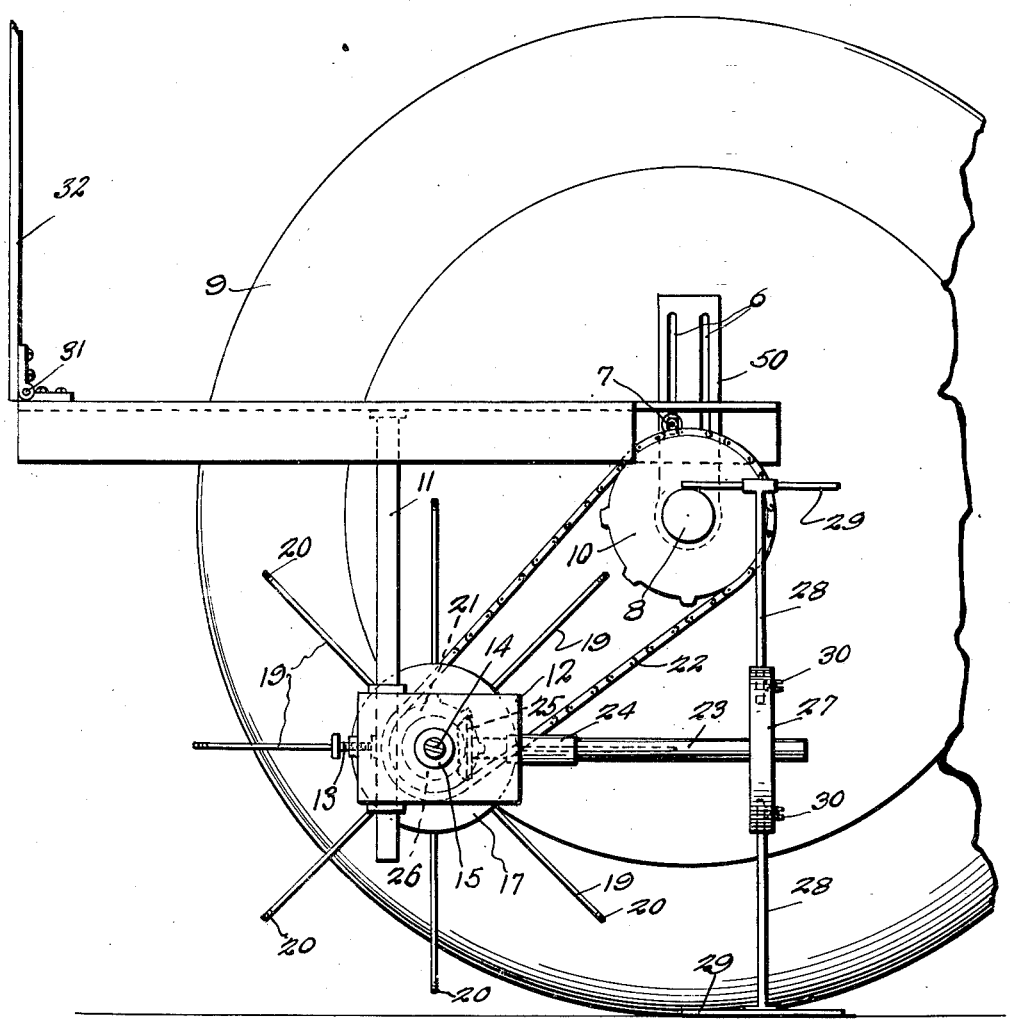
Figure 3 is a side elevation of the improved cotton chopper and cultivator.
Figure 4:
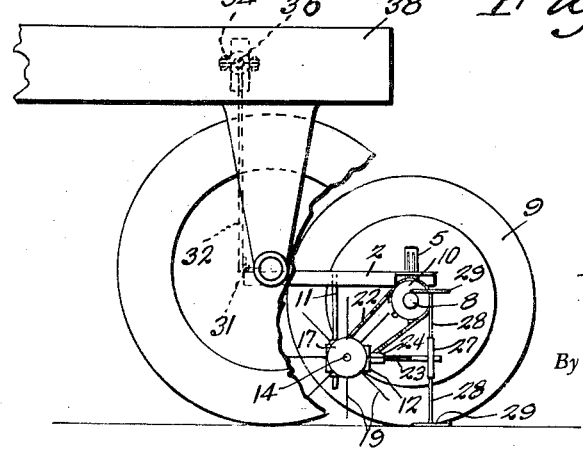
Figure 4 is a side elevation of the improved cotton chopper and cultivator shown attached to the main tractor cultivator frame.
Figure 5:
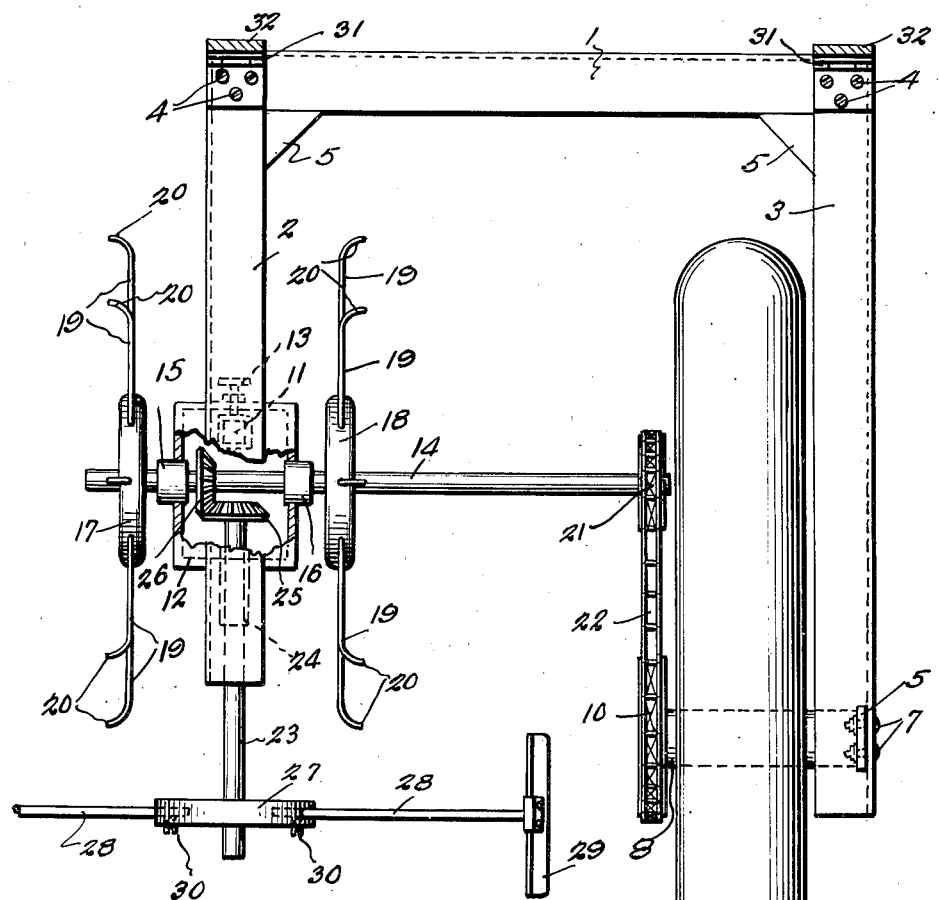
Figure 5 is a plan view of the improved cotton chopper and cultivator with part of the frame and gear box broken away.
Figure 6:
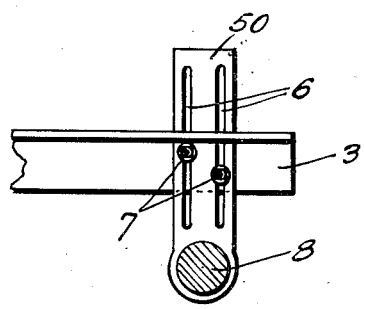
Figure 6 is a view taken on the line 6—6 of Figure 1, showing the stub axle for the ground wheel in section.

In carrying out the invention, there is provided an improved cotton chopper and cultivator including a U-frame made from angle iron and having a back member 1 connected to the forwardly extending side arms 2 and 3 by means of the bolts or screws 4, said frame being reinforced by the connecting webs 5 at the juncture points between the ends of the back member 1 and the attached side members 2 and 3.

A depending bracket arm 50 is formed with the spaced slots 6 and is secured to the side member 3 by means of bolts 7 extending through the slots in the arm and the adjacent side member 3, and supports an inwardly directed rotatable stub shaft 8 on its lower extremity, whereby the shaft 8 may be adjusted vertically with respect to the ground as desired.

A ground-engaging wheel 9 is secured to the stub shaft 8, and a sprocket 10 is fixed to the inner end of the shaft 8 to rotate with said wheel 9.

A depending square supporting standard 11 is secured to the side member 2, and is adapted to support the gear box 12 for vertical adjustment thereon, and to be secured in the desired position by means of the standard engaging set screw 13 extending through the said gear box. The shaft 14 is mounted transversely of the gear box 12 in the bearings 15 and 16, and extends a considerable distance outwardly from the sides of the said gear box.

The hub members 17 and 18 are secured to the shaft 14 to rotate therewith, and support the plurality of wire spring fingers 19 having bent terminal ends 20, which are adapted to loosen the dirt along the rows of cotton and to take the grass therefrom.

A sprocket 21 is fixed to the end of the shaft 14 adjacent the ground wheel 9, and is adapted to be aligned with the sprocket 10 on the stub shaft 8 and to be connected thereto by means of the sprocket chain 22.

A shaft 23 is rotatably supported by the gear box 12 in a suitable bearing 24, and supports the bevel gear 25 on its inner end which intermeshes with the bevel gear 26 on the cross shaft 14. A head 27 is secured to the forward end of the shaft 23, and is adapted to support the outwardly extending rods 28 on the end of which the chopping hoes 29 are mounted for use in blocking out the cotton. Set screws 30 will extend through the head 27 to lock the rod 28 and hoes 29 in assembled position.

If desired, a hub similar to the hub members 17 and 18 with spring fingers 19 may be substituted on the end of the shaft 23 for the chopper, to take out the grass by running across the row.

The hinges 31 will be secured to the opposite ends of the cross or back member 1 of the U-frame and to the depending arms 32 of the chopper supporting frame, to permit the U-frame with the ground wheel and associated mechanism to rise and fall as the wheel follows the uneven contour of the ground.

Clamps 34 will be positioned at the upper ends of the chopper supporting arms 32 and will connect to the laterally extending cultivator frame 36 of the tractor on the main tractor cultivator frame 38.

From the foregoing description, it will be apparent that there has been provided a highly efficient cotton chopper and cultivator which will perform the multiple operations of blocking out the cotton, cleaning the grass therefrom, loosening the soil in the rows and dirting up the rows in one operation.

The preferred embodiment of the invention has been illustrated and described, but it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A cotton chopper and cultivator including a wheel supported main frame, spaced depending supporting arms attached to said main frame, a forwardly extending U-shaped angle frame pivotally attached to said depending arms, a vertically adjustable bracket on one leg of said angle frame, a stub shaft supported by said bracket, a ground engaging driving wheel on said stub shaft, a sprocket on said shaft being rotatable with said wheel, a gear box supported by the other leg of said angle frame, inter-connected right angularly extending shafts in said gear box, rotatable dirt loosening fingers on one of said shafts, a rotary cotton chopper on the other of said shafts, and a driving connection between said first mentioned shaft in the gear box and the sprocket upon said stub shaft.

2. A cotton chopper and cultivator including a wheel supported main frame, spaced depending supporting arms attached to said main frame, a forwardly extending U-shaped angle frame pivotally attached to said depending arms, a vertically adjustable bracket on one leg of said angle frame, a stub shaft supported by said bracket, a ground engaging driving wheel on said stub shaft, a sprocket on said shaft being rotatable with said wheel, a gear box supported by the other leg of said angle frame, inter-connected right angularly extending shafts in said gear box, rotatable dirt loosening fingers on one of said shafts, a rotary cotton chopper on the other of said shafts, a sprocket on the end of the shaft upon which the rotatable dirt loosening fingers are mounted, and a sprocket chain between said sprocket and the sprocket on said stub shaft.

3. A cotton chopper and cultivator including a wheel supported main frame, spaced depending supporting arms attached to said main frame, a forwardly extending U-shaped angle frame pivotally attached to said depending arms, a vertically adjustable bracket on one leg of said angle frame, a stub shaft supported by said bracket, a ground engaging driving wheel on said stub shaft, a sprocket on said shaft being rotatable with said wheel, a depending standard on the other leg of said angle frame, a gear box supported on said standard for vertical adjustment, inter-connected right angularly extending shafts in said gear box, rotatable dirt loosening fingers on one of said shafts, a rotary cotton chopper on the other of said shafts, a sprocket on the end of the shaft upon which the rotatable dirt loosening fingers are mounted, and a sprocket chain between said sprocket and the sprocket on said stub shaft.

4. A cotton chopper and cultivator including a wheel supported main frame, spaced depending supporting arms attached to said main frame, a forwardly extending U-shaped angle frame pivotally attached to said depending arms, a vertically adjustable bracket on one leg of said angle frame, a stub shaft supported by said bracket, a ground engaging driving wheel on said stub shaft, a sprocket on said shaft being rotatable with said wheel, a depending standard of square cross section fixed to the other leg of said angle frame, a gear box non-rotatably mounted on said standard for vertical adjustment, inter-connected right angularly extending shafts in said gear box, rotatable dirt loosening fingers on one of said shafts, a rotary cotton chopper on the other of said shafts, a sprocket on the end of the shaft upon which the rotatable dirt loosening fingers are mounted, and a sprocket chain between said sprocket and the sprocket on said stub shaft, whereby said ground engaging driving wheel will operate said rotatable dirt loosening fingers and said rotary cotton chopper as the cotton chopper and cultivator is pulled along the ground.

JOHN V. SCHUG.

REFERENCES CITED

The following references are of record in the file of this patent:

UNITED STATES PATENTS

| Number | Name | Date |
| --- | --- | --- |
| 967,921 | Hughes | Aug. 23, 1910 |
| 1,264,720 | Cook | Jan. 4, 1921 |
| 2,193,308 | Uyehara | Mar. 12, 1940 |

FOREIGN PATENTS

| Number | Country | Date |
| --- | --- | --- |
| 22,829 | Norway | Dec. 2, 1912 |